US010318650B2

(12) United States Patent
Huang et al.

(10) Patent No.: US 10,318,650 B2
(45) Date of Patent: *Jun. 11, 2019

(54) IDENTIFYING CORRUPTED TEXT SEGMENTS

(71) Applicant: International Business Machines Corporation, Armonk, NY (US)

(72) Inventors: Chao Yuan Huang, Taipei (TW); Yi-Lin Tsai, Taichung (TW); Der-Joung Wang, New Taipei (TW); Yen-Min Wu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/000,306

(22) Filed: Jun. 5, 2018

(65) Prior Publication Data

US 2018/0285411 A1 Oct. 4, 2018

Related U.S. Application Data

(63) Continuation of application No. 15/661,327, filed on Jul. 27, 2017, now Pat. No. 10,025,812, which is a continuation of application No. 15/059,522, filed on Mar. 3, 2016.

(51) Int. Cl.
*G06F 17/30* (2006.01)
*G06F 17/24* (2006.01)
*G06F 17/27* (2006.01)

(52) U.S. Cl.
CPC ........ *G06F 17/30371* (2013.01); *G06F 17/24* (2013.01); *G06F 17/275* (2013.01); *G06F 17/30613* (2013.01)

(58) Field of Classification Search
None
See application file for complete search history.

(56) References Cited

U.S. PATENT DOCUMENTS

| 5,062,143 A | 10/1991 | Schmitt |
| 7,689,409 B2 | 3/2010 | Heinecke |
| 8,027,832 B2 | 9/2011 | Ramsey et al. |
| 8,908,972 B2 | 12/2014 | You |
| 2005/0125731 A1 | 6/2005 | Jurion et al. |

(Continued)

FOREIGN PATENT DOCUMENTS

CN 102479174 A 5/2012

OTHER PUBLICATIONS

Apendix P List of IBM Patents or applications treated as related. Dated Jun. 7, 2018. Two pages.

(Continued)

*Primary Examiner* — Aleksandr Kerzhner
*Assistant Examiner* — Eddy Cheung
(74) *Attorney, Agent, or Firm* — Stephen R. Yoder

(57) ABSTRACT

A computer system for taking a corrective action upon determination of an existence of a corrupted text segment within a set of web pages. Determination includes: determining a language affinity indicator corresponding to text segments within the set of web pages; generating an indexing repository based on a set of text artifacts within the text segments; creating an occurrence table for the set of text artifacts; and determining compliance of the text artifacts and text segments based on the single language grouping on which the set of text segments are based.

1 Claim, 5 Drawing Sheets

(56) References Cited

U.S. PATENT DOCUMENTS

| | | |
|---|---|---|
| 2006/0184357 A1 | 8/2006 | Ramsey |
| 2008/0181504 A1 | 7/2008 | Kudomi |
| 2014/0380169 A1 | 12/2014 | Eldawy et al. |
| 2015/0026828 A1 | 1/2015 | Adams |
| 2015/0057991 A1 | 2/2015 | Mesheryakov et al. |
| 2017/0255665 A1 | 9/2017 | Huang et al. |

OTHER PUBLICATIONS

Original U.S. Appl. No. 15/059,522, filed Mar. 3, 2016.
Original U.S. Appl. No. 16/001,301, filed Jun. 6, 2018.
"A method of detecting garbage characters using syntactic analysis of natural language" An IP.com Prior Art Database Technical Disclosure. IPCOM000237004DIP.com Electronic Publication Date: May 27, 2014. Four pages.

| Text Artefact | Language-Specific Occurrence Value |
| --- | --- |
| α — 411 | .6 |
| B — 412 | .5 |
| @ — 413 | .1 |
| $ — 414 | .05 |
| € — 415 | .06 |
| £ — 416 | .08 |
| Π — 417 | .001 |

FIG. 4

IDENTIFYING CORRUPTED TEXT SEGMENTS

BACKGROUND

The present invention relates generally to the field of text segment analysis, and more particularly to identifying text segments that are corrupted.

Identifying corrupted text segments is important for applications that are involved in transmission and/or rendering of such text segments. Corrupted text segments could be a sign of software failure in computer applications such as networking applications, web security applications, or web browsers. Developers and users of computer systems continue to face difficulties with inefficient methods of identifying corrupted text segments.

SUMMARY

A computer system includes: selecting a set of web pages containing text associated with a single language grouping; determining a set of text segments within the set of web pages; determining a language affinity indicator corresponding to each text segment in the set of text segments, the language affinity indicator being a comparison value of a text segment with a set of predefined rules corresponding to the single language grouping; responsive to each language affinity indicator indicating an affinity to the single language grouping, identifying a set of text artefacts within the text segments; generating an indexing repository based on the set of text artefacts; creating an occurrence table from the indexing repository; determining a compliance threshold value for the occurrence table; identifying an individual occurrence value for each unique text artefact in the set of text artefacts, the individual occurrence value being the probability that a text artefact occurs within the occurrence table based on the single language grouping; and determining a compliance value for the set of text segments by, for each text segment in the set of text segments: computing a compliance sum value for a first text segment in the set of text segments, adjusting the compliance sum value according to the individual occurrence values of a subset of text artefacts occurring in the first text segment, determining a segment length value associated with the first text segment, and adjusting the compliance sum value according to the segment length value; responsive to computing a set of compliance sum values for each text segment in the set of text segments, computing the compliance value based on an average value of the set of compliance sum values; computing a compliance indicator for the set of text segments by comparing the compliance value and the compliance threshold; and responsive to the compliance indicator indicating that the compliance value is less than the compliance threshold, taking a corrective action. The corrective action is an action selected from the group consisting of: notifying a user of a corrupted set of text segments in the selected set of web pages, and preventing the selected set of web pages from being accessed again.

BRIEF DESCRIPTION OF THE DRAWINGS

FIG. 4 is an operational example of data contained in a language-specific occurrence database, in accordance with at least one embodiment of the present invention.

DETAILED DESCRIPTION

Figure 1:
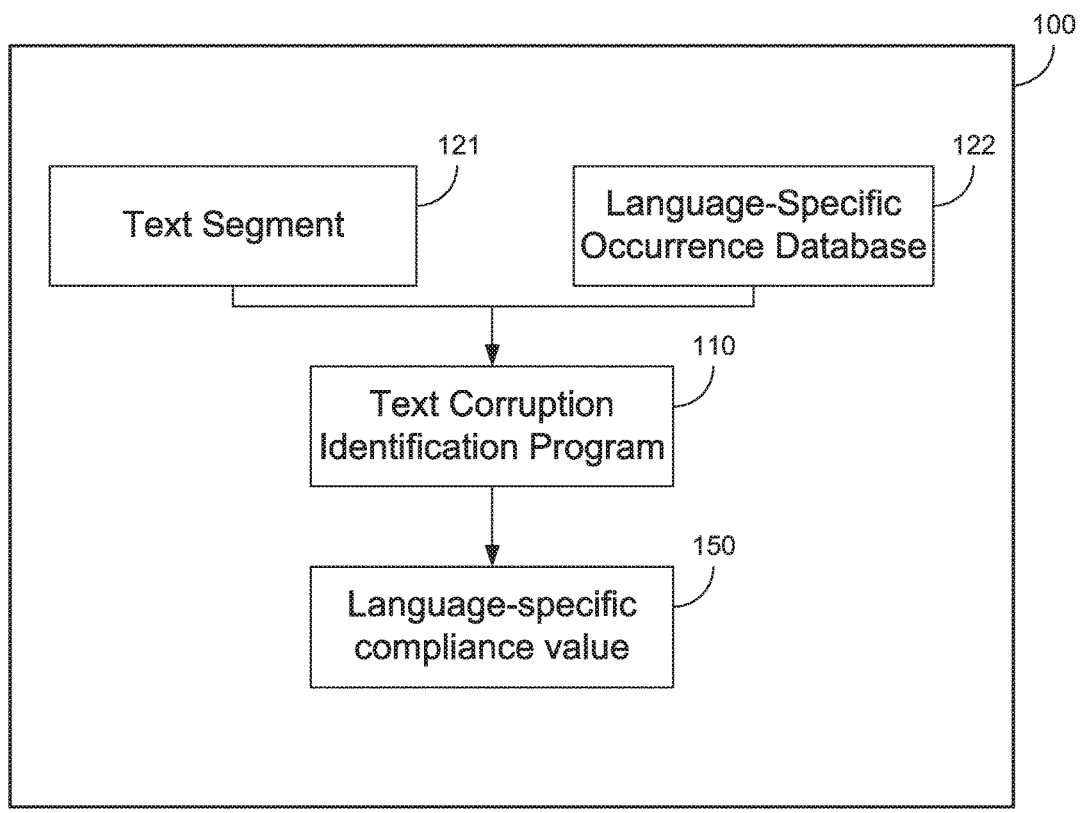
FIG. 1 is a block diagram of one embodiment of a computer system environment suitable for operation of a text corruption identification program, in accordance with at least one embodiment of the present invention.

FIG. 1 is a block diagram of a computer system environment 100 suitable for operating a text corruption identification program 110, in accordance with at least one embodiment of the present invention. In the computer system environment 100 depicted in FIG. 1, a text segment 121 is any collection of one or more text artefacts, whether stored contiguously or non-contiguously and whether stored in one computer readable storage media unit or in a distributed manner. In at least some embodiments, a text artefact is any computer representation of at least one grapheme unit (such as an alphabetical character), grapheme-like unit (such as digits), and/or symbol unit (such as a pentation or mathematical symbol). In at least some embodiments, a text artefact is a combination of one or more characters defined in one or more text encoding schemes (such as one or more Unicode encoding schemes). In at least some embodiments, a text artefact also includes a predefined order and/or one or more predefined rules for determining the order of one or more characters defined in one or more particular Unicode encoding schemes.

In the computer system environment 100 depicted in FIG. 1, a language-specific occurrence database 122 is any collection of one or more information artefacts that relate and/or associate one or more text artefacts to one or more language-specific occurrence values. In at least some embodiments, the language-specific occurrence database is associated with at least one language grouping. In at least some embodiments, a language grouping is defined by one or more the text artefacts available and/or usable in the language grouping as well as a representation and/or an approximation of the probability that each of the one or more text artefacts occurs within at least one language grouping. In at least some embodiments, each of the one or more language-specific occurrence values represents and/or approximates the probability that a particular text artefact occurs within the at least one language grouping associated with the language-specific occurrence database 122.

In the computer system environment 100 depicted in FIG. 1, the text corruption identification program 110 uses the text segment 121 and the language-specific occurrence database 122 to determine a language-specific compliance value 150 associated with the text segment 121. In at least some embodiments, the language-specific compliance value 150 is a representation and/or approximation of whether the text segment 121 belongs to the at the at least one language grouping associated with the language-specific occurrence database 122.

Figure 2:
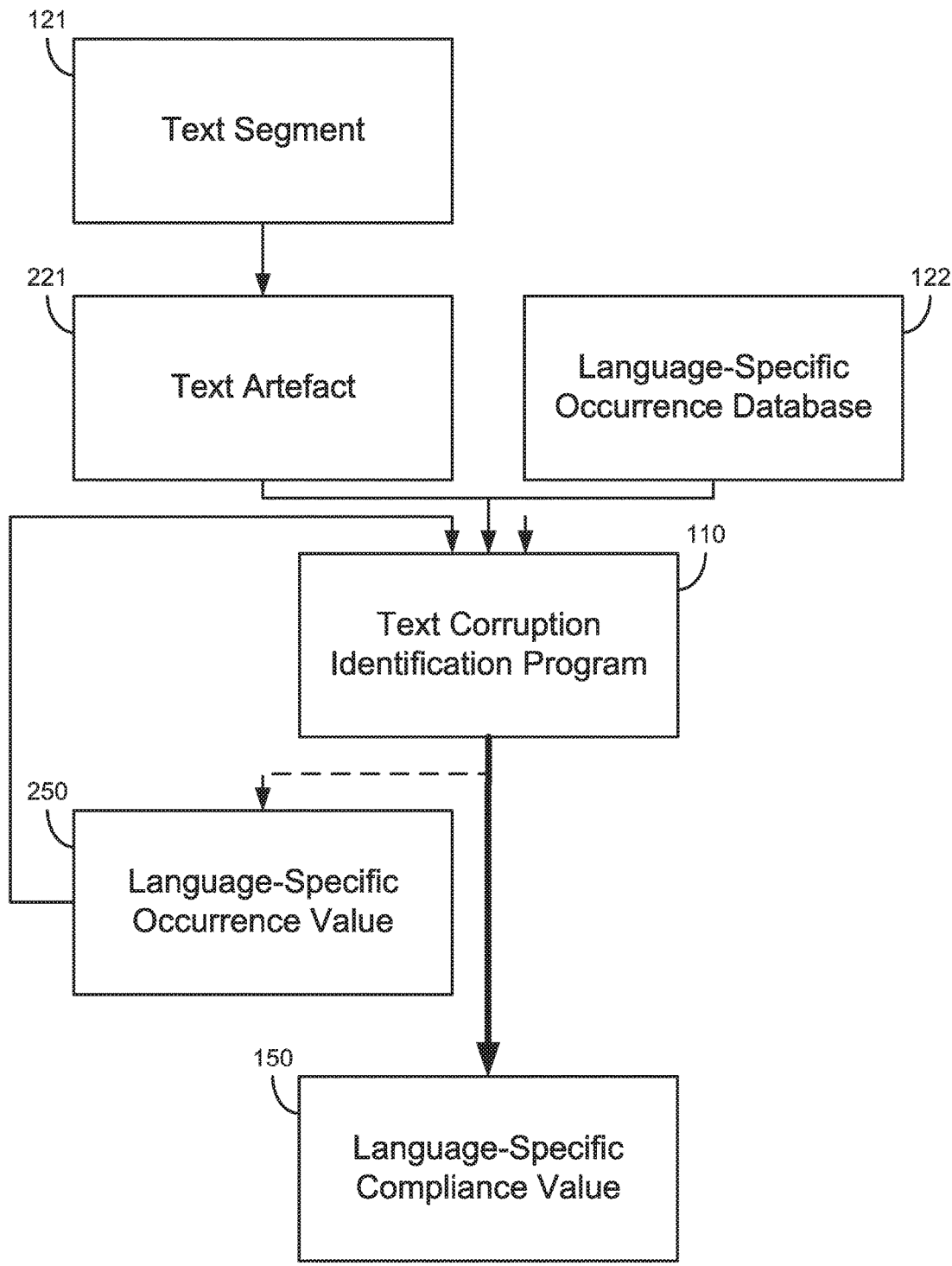
FIG. 2 is a data-flow diagram of a text corruption identification program, in accordance with at least one embodiment of the present invention.

FIG. 2 is a data-flow diagram of a text corruption identification program 110, in accordance with at least one embodiment of the present invention. In the embodiment depicted in FIG. 2, the program 110 uses the one or more text artefacts 221 (determined based on the text segment 121) and the language-specific occurrence database 122 to determine a language-specific occurrence value 250 for each text artefact 221. The program 110 uses the language-specific occurrence values 250 determined for each text artefact 221 to determine a language-specific compliance value 150 associated with the text segment 121 (e.g., by averaging the language-specific occurrence values 250 of the one or more text artefacts 221 or averaging the language-specific occurrence values 250 of the one or more text artefacts 221 and dividing the average by a value representing the length of the text segment 121).

Figure 3:
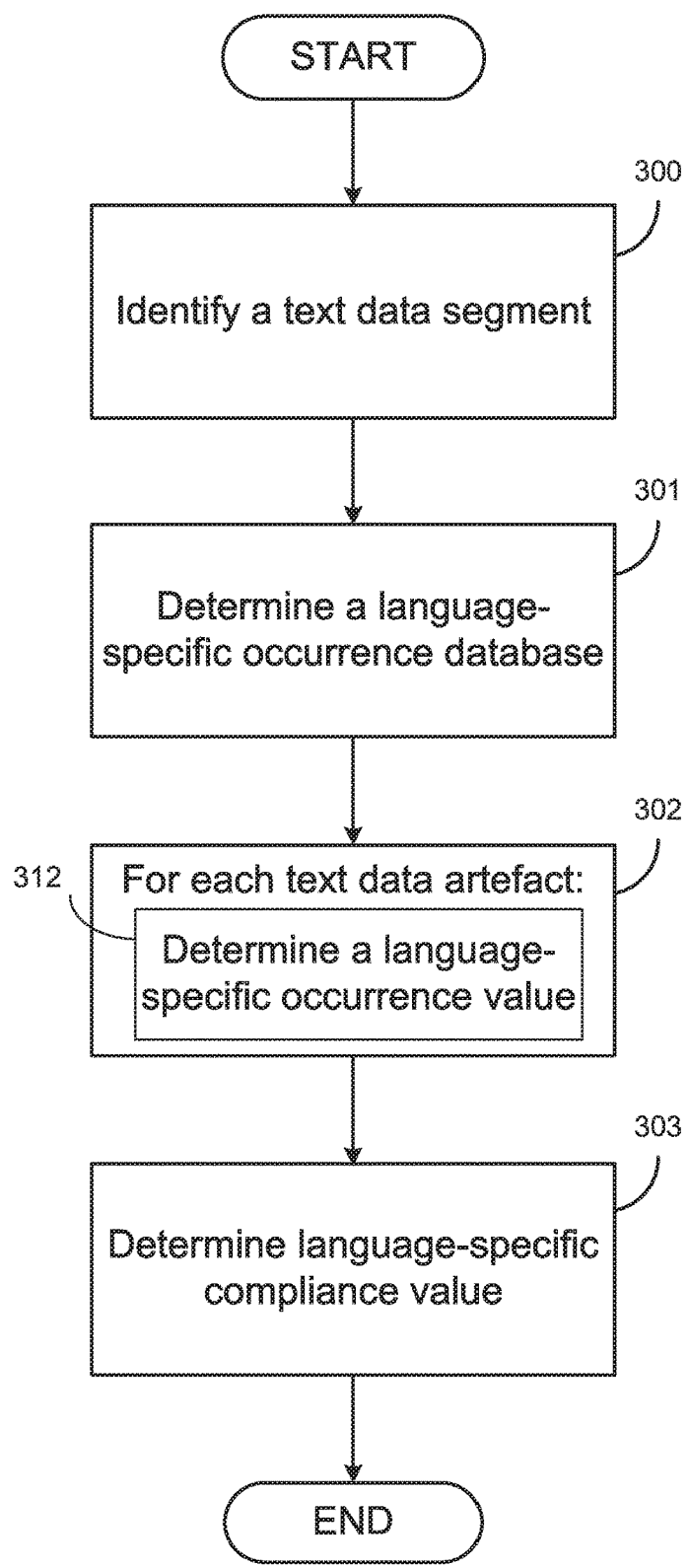
FIG. 3 is a flow-chart diagram of a text corruption identification program, in accordance with at least one embodiment of the present invention.

FIG. 3 is a flow-chart diagram of a text corruption identification program, in accordance with at least one embodiment of the present invention. At step 300, the program identifies a text segment comprising one or more text artefacts. At step 301, the program determines a language-specific occurrence database associated with the text segment. At step 302, for each of the one or more text artefacts, the program determines a language specific occurrence value based on the language-specific occurrence database (at sub-step 312). At step 303, the program determines a language-specific compliance value based on each language-specific occurrence value.

FIG. 4 is an operational example of data contained in a language-specific occurrence database, in accordance with at least one embodiment of the present invention. In the embodiment depicted in FIG. 4, column 221 contains text artefacts and column 250 contains the language-specific occurrence values 250 associated with the text artefacts 221. As such, text artefact "a" 411 has a language-specific occurrence value 0.6; text artefact "B" 412 has a language-specific occurrence value 0.5; text artefact "@" 413 has a language-specific occurrence value 0.1; text artefact "$" 414 has a language-specific occurrence value 0.05; text artefact "€" 415 has a language-specific occurrence value 0.06; text artefact "£" 416 has a language-specific occurrence value 0.08; and text artefact "π" 417 has a language-specific occurrence value 0.001.

In some embodiments, determining the language-specific occurrence value comprises: (i) identifying a segment length value associated with the text segment; (ii) identifying a compliance sum value associated with the text segment; (iii) for each of the one or more text artefacts, adjusting the compliance sum value by the language-specific occurrence value; and (iv) adjusting the language-specific compliance value by the segment length value. In at least some embodiments, a segment length value is any representation and/or approximation of the number of text artefacts and/or text characters in a text segment. In at least some embodiments, a compliance sum value associated with a text segment is any representation and/or approximation of the number of language-specific occurrence values associated with one or more text artefacts in the text segment. In some embodiments, adjusting the language-specific compliance value by a language-specific occurrence value includes adding the language-specific occurrence value to the compliance sum value. In some embodiments, adjusting the language-specific compliance value by the segment length value includes dividing the language-specific compliance value by the segment length value. In some embodiments, identifying a segment length value comprises determining the segment length value. In some embodiments, identifying a compliance sum value comprises determining the compliance sum value.

In some embodiments, the text corruption identification program further comprises identifying a compliance threshold associated with the language-specific occurrence database and determining a compliance indicator based on the language-specific compliance value and the compliance threshold. In at least some embodiments, a compliance threshold associated with the language-specific occurrence database is any representation and/or approximation of the minimum language-specific compliance value required for compliance with the language grouping to which the language-specific occurrence database belongs, such that if the language-specific compliance value associated with a text segment is smaller than the compliance threshold the text segment is considered to not comply with the language grouping to which the language-specific occurrence database belongs. In at least some embodiments, a compliance indicator is any representation and/or approximation of whether a text segment complies with a language grouping to which the language-specific occurrence database belongs. In at least some embodiments, identifying a compliance threshold comprises determining the compliance threshold. In at least some embodiments, determining a compliance indicator based on the compliance value and the language-specific compliance threshold comprises: (i) determining a compliance indicator denoting that the text segment complies with a language grouping to which the language-specific occurrence database belongs if the language-specific compliance equals or exceeds the compliance threshold; and (ii) determining a compliance indicator denoting that the text segment does not comply with a language grouping to which the language-specific occurrence database belongs if the language-specific compliance falls below the compliance threshold.

In some embodiments, the text corruption identification program further comprises, responsive to the compliance indicator indicating that said compliance value is less than said compliance threshold, determining at least one corrective action selected from the group consisting of: (i) notifying at least ones viewer of said text segment; (ii) downloading said text segment again; and (iii) preventing said text segment from being accessed again. In some embodiments, the program further comprises determining an indexing repository based on at least one webpage; and wherein determining the language-specific occurrence database is performed based on the indexing repository. In at least some embodiments, an indexing repository associated with at least one webpage is any indication of part or all of the contents of the at least one webpage.

In some embodiments, determining the language-specific occurrence database comprises identifying at least one language grouping associated with the language-specific occurrence database and, for each of the at least one language grouping, determining a language affinity indicator associated with the text segment. In at least some embodiments, an affinity indicator associated with a language grouping and the text segment is any representation and/or approximation of whether the text segment belongs to and/or complies with the rules of the language grouping. In some embodiments, the text corruption identification program further comprises identifying a text file which comprises the text segment, identifying an overall compliance value associated with the text file, and adjusting the overall compliance value based on the language-specific compliance value. In at least some embodiments, the overall compliance value associated with a text file is a representation and/or approximation of whether the text file belongs to the at the at least one language grouping associated with the language-specific occurrence database.

In general, one or more steps associated with different embodiments of the text corruption identification program may be performed based on one or more pieces of information obtained directly or indirectly from one or more computer (hardware or software) components, one or more pieces of information obtained directly or indirectly from one or more inputs from one or more users, and/or one or more observed behaviors associated with one or more (hardware or software) components of one or more computer system environments. In general, one or more steps of different embodiments of the text corruption identification program may comprise communicating with one or more computer (hardware or software) components, issuing one or more computer instructions (e.g., one or more special purpose machine-level instructions defined in the instruction set of one or more computer hardware components), and/or communicating with one or more computer components at the hardware level.

Aspects of the present invention enable identifying corrupted text segments in a manner that involves using existing web resources and preprocessed data, and as such does not involve using extensive real-time analysis of a text segment or costly statistical learning solutions. Nevertheless, the aforementioned advantages are not required to be present in all of the embodiments of the invention and may not be present in all of the embodiments of the invention.

Figure 5:
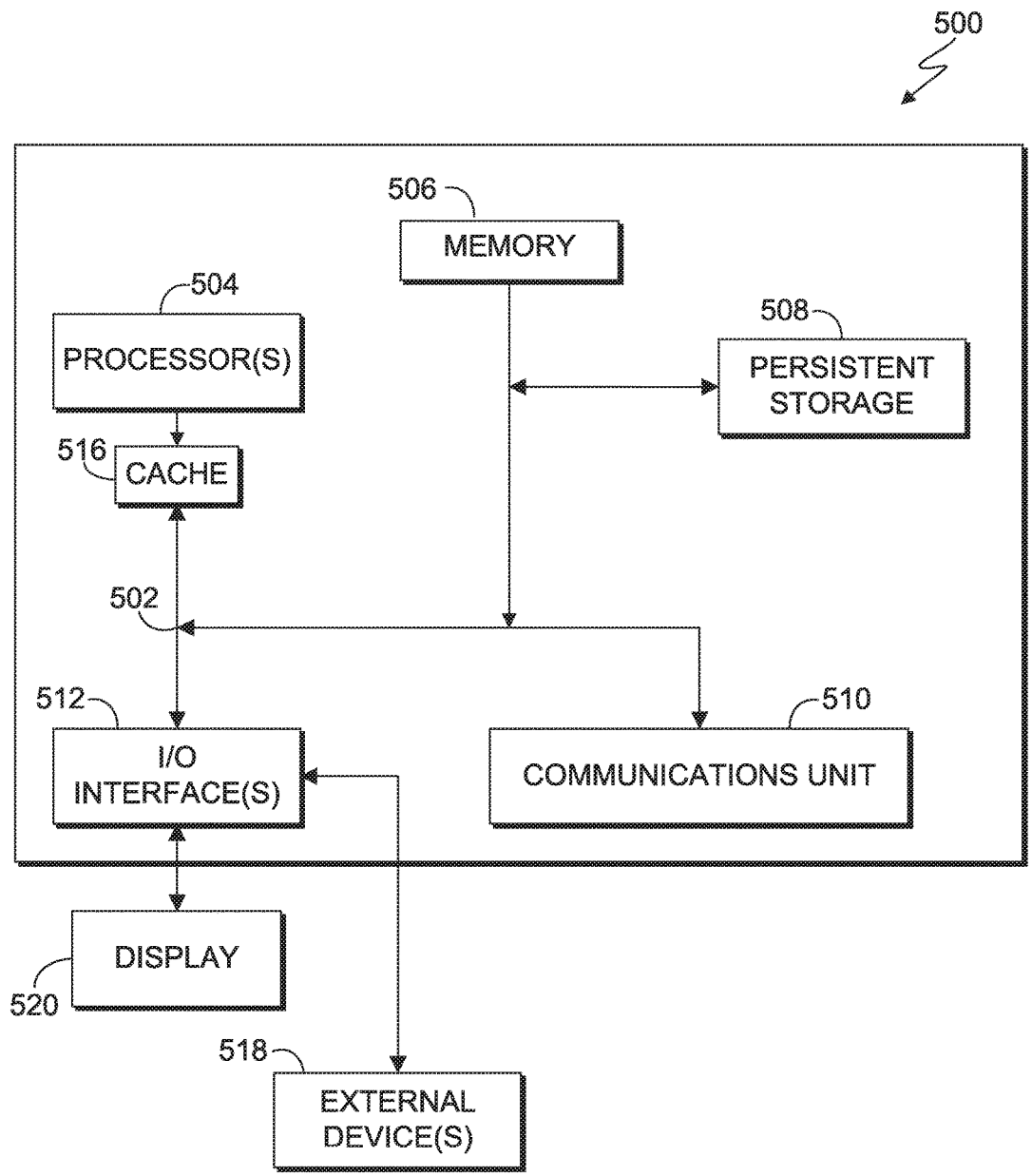
FIG. 5 is a block diagram of a computing apparatus suitable for executing a text corruption identification program, in accordance with at least one embodiment of the present invention.

FIG. 5 is a block diagram depicting components of a computer 500 suitable for executing the text corruption identification program. FIG. 5 displays the computer 500, the one or more processor(s) 504 (including one or more computer processors), the communications fabric 502, the memory 506, the RAM, the cache 516, the persistent storage 508, the communications unit 510, the I/O interfaces 512, the display 520, and the external devices 518. It should be appreciated that FIG. 5 provides only an illustration of one embodiment and does not imply any limitations with regard to the environments in which different embodiments may be implemented. Many modifications to the depicted environment may be made.

As depicted, the computer 500 operates over a communications fabric 502, which provides communications between the cache 516, the computer processor(s) 504, the memory 506, the persistent storage 508, the communications unit 510, and the input/output (I/O) interface(s) 512. The communications fabric 502 may be implemented with any architecture suitable for passing data and/or control information between the processors 504 (e.g., microprocessors, communications processors, and network processors, etc.), the memory 506, the external devices 518, and any other hardware components within a system. For example, the communications fabric 502 may be implemented with one or more buses or a crossbar switch.

The memory 506 and persistent storage 508 are computer readable storage media. In the depicted embodiment, the memory 506 includes a random access memory (RAM). In general, the memory 506 may include any suitable volatile or non-volatile implementations of one or more computer readable storage media. The cache 516 is a fast memory that enhances the performance of computer processor(s) 504 by holding recently accessed data, and data near accessed data, from memory 506.

Program instructions for the text corruption identification program may be stored in the persistent storage 508 or in memory 506, or more generally, any computer readable storage media, for execution by one or more of the respective computer processors 504 via the cache 516. The persistent storage 508 may include a magnetic hard disk drive. Alternatively, or in addition to a magnetic hard disk drive, the persistent storage 508 may include, a solid state hard disk drive, a semiconductor storage device, read-only memory (ROM), electronically erasable programmable read-only memory (EEPROM), flash memory, or any other computer readable storage media that is capable of storing program instructions or digital information.

The media used by the persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of the persistent storage 508.

The communications unit 510, in these examples, provides for communications with other data processing systems or devices. In these examples, the communications unit 510 may include one or more network interface cards. The communications unit 510 may provide communications through the use of either or both physical and wireless communications links. The text corruption identification program may be downloaded to the persistent storage 508 through the communications unit 510. In the context of some embodiments of the present invention, the source of the various input data may be physically remote to the computer 500 such that the input data may be received and the output similarly transmitted via the communications unit 510.

The I/O interface(s) 512 allows for input and output of data with other devices that may operate in conjunction with the computer 500. For example, the I/O interface 512 may provide a connection to the external devices 518, which may include a keyboard, keypad, a touch screen, and/or some other suitable input devices. External devices 518 may also include portable computer readable storage media, for example, thumb drives, portable optical or magnetic disks, and memory cards. Software and data used to practice embodiments of the present invention may be stored on such portable computer readable storage media and may be loaded onto the persistent storage 508 via the I/O interface(s) 512. The I/O interface(s) 512 may similarly connect to a display 520. The display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system comprising:
   one or more computer processors;
   one or more computer readable storage device;
   program instructions stored on the one or more computer readable storage devices for execution by at least one of the one or more computer processors, the stored program instructions comprising:
      program instructions to select a set of web pages containing text associated with a single language grouping;
      program instructions to determine a set of text segments within the set of web pages;
      program instructions to determine a language affinity indicator corresponding to each text segment in the set of text segments, the language affinity indicator being a comparison value of a text segment with a set of predefined rules corresponding to the single language grouping;

program instructions to, responsive to each language affinity indicator indicating an affinity to the single language grouping, identify a set of text artefacts within the text segments;
program instructions to generate an indexing repository based on the set of text artefacts;
program instructions to create an occurrence table from the indexing repository;
program instructions to determine a compliance threshold value for the occurrence table;
program instructions to identify an individual occurrence value for each unique text artefact in the set of text artefacts, the individual occurrence value being the probability that a text artefact occurs within the occurrence table based on the single language grouping; and
program instructions to determine a compliance value for the set of text segments by, for each text segment in the set of text segments:
  program instructions to compute a compliance sum value for a first text segment in the set of text segments;
  program instructions to adjust the compliance sum value according to the individual occurrence values of a subset of text artefacts occurring in the first text segment;
  program instructions to determine a segment length value associated with the first text segment; and
  program instructions to adjust the compliance sum value according to the segment length value;
program instructions to, responsive to computing a set of compliance sum values for each text segment in the set of text segments, compute the compliance value based on an average value of the set of compliance sum values;
program instructions to compute a compliance indicator for the set of text segments by comparing the compliance value and the compliance threshold; and
program instructions to, responsive to the compliance indicator indicating that the compliance value is less than the compliance threshold, take a corrective action;
wherein:
the corrective action is an action selected from the group consisting of:
  notifying a user of a corrupted set of text segments in the selected set of web pages; and
  preventing the selected set of web pages from being accessed again.

* * * * *